United States Patent [19]

Nadeau et al.

[11] Patent Number: 4,733,051
[45] Date of Patent: Mar. 22, 1988

[54] METHOD AND APPARATUS FOR CONTROLLING ROOT PASS WELD PENETRATION IN OPEN BUTT JOINTS

[75] Inventors: François Nadeau, St-Bruno; Pierre Fafard, Ste-Julie; Guy Patenaude, Beloeil; Jean Tremblay, Longueuil, all of Canada

[73] Assignee: Canadian Patents and Development Limited, Ottawa, Canada

[21] Appl. No.: 89,128

[22] Filed: Aug. 25, 1987

[51] Int. Cl.$^4$ ............................................. B23K 9/12
[52] U.S. Cl. ........................... 219/130.21; 219/60 A; 219/124.34; 219/125.12; 219/130.01
[58] Field of Search ...................... 219/130.01, 124.34, 219/130.21, 60 A, 125.11, 125.1

[56] References Cited

U.S. PATENT DOCUMENTS

| | | | |
|---|---|---|---|
| 2,089,015 | 8/1937 | Bucknam et al. | 219/130.21 |
| 3,264,447 | 8/1966 | Agnew | 219/124.02 |
| 3,299,250 | 1/1967 | Vilkas et al. | 219/130.21 |
| 3,567,899 | 3/1971 | Iceland et al. | 219/130.21 |
| 3,855,446 | 12/1974 | Kotova et al. | 219/124.34 |
| 4,021,840 | 5/1977 | Ellsworth et al. | 219/124.34 |
| 4,144,992 | 3/1979 | Omae et al. | 219/60 A |
| 4,305,096 | 12/1981 | Yokoshima et al. | 358/101 |
| 4,532,404 | 7/1985 | Boillot et al. | 219/124.34 |

OTHER PUBLICATIONS

R. Niepold et al., "PASS-A Visual Sensor for Seam Tracking and On-Line Process Parameter Control in Arc-Welding Applications", Proc. 14th Int. Symposium on Industrial Robots, Oct. 1984, pp. 375-385.

Primary Examiner—Clifford C. Shaw
Attorney, Agent, or Firm—Schwartz, Jeffery, Schwaab, Mack, Blumenthal & Evans

[57] ABSTRACT

The invention is concerned with controlling weldpool penetration during root pass welding in an open butt joint defined in a workpiece to be welded by a welding torch with a welding wire being continuously fed from the welding torch to the joint to form a weldpool penetrating the joint, the workpiece and welding torch being movable relative to one another. A visual sensor is positioned ahead of the welding torch and in alignment with the joint for frontly viewing the weldpool at an angle of about 10° to about 20° relative to a line tangent to the workpiece at the weldpool, to thereby provide a full image of the weldpool defining a weldpool contour line, the sensor and welding torch being disposed on a common side relative to the workpiece. The weldpool image is then processed through a computer including image processor operatively coupled to controller, the image processor analyzing the weldpool contour line to derive therefrom weldpool penetration depth and comparing the weldpool penetration depth with a predetermined value, to thereby provide an information signal representative of weldpool penetration error which is fed to the controller, the controller issuing control signals in response to the information signal for controlling welding parameters such as to provide a root pass weld having a predetermined penetration.

15 Claims, 6 Drawing Figures

METHOD AND APPARATUS FOR CONTROLLING ROOT PASS WELD PENETRATION IN OPEN BUTT JOINTS

BACKGROUND OF THE INVENTION

The present invention relates to improvements in the field of arc welding. More particularly, the invention is concerned with a method and apparatus for controlling weldpool penetration during poor pass welding in open butt joints.

On of the most common type of welds found in industry, especially for industrial pipe fabrication, is the open butt joint weld. Such a type of weld is most often a multipass weld since more than one pass of the welding torch over the workpiece joint is generally required to fill the joint, but the first or "root" pass is by far the most difficult to perform and only experienced certified welders are able to achieve good quality root pass welds having adequate penetration. Precise centering of the welding torch in the joint and critical control of the welding parameters, i.e. heat and mass balance, are required to maintain an adequate penetration of the weldpool. Tolerances for weld penetration are particularly stringent: too much penetration will obstruct the flow in the pipe while too little leaves stress raising defects that dramatically reduce the fatigue life of the joint. Thus, one can see that automation of this type of welding presents a major problem, namely weldpool penetration control.

Means for controlling weld penetration have already been proposed, for instance in U.S. Pat. Nos. 3,299,250 and 3,567,899. According to these patents, the depth of penetration of the weld is measured indirectly by means of infrared sensors which sense the infrared radiation emanating from the molten metal at the weld. The heat flow characteristics of the weld as monitored by the infrared sensors are then processed to provide control signals for controlling the current applied to the welding torch. Such weld penetration control systems, however, are applicable only to closed butt joints such as U-shaped or square butt joints, where mechanical forces play a very little role, if any, and where geometry is constant and the heat flow is the determining factor. In an open butt joint, the weldpool is in a mechanical equilibrium that changes much more rapidly than temperature and is affected by many other factors, e.g. gap, alignment, root face, etc.

SUMMARY OF THE INVENTION

It is therefore an object of the present invention to overcome the above drawbacks and to provide a method and apparatus for controlling weldpool penetration during root pass welding in open butt joints, thereby enabling root pass welding and thus pipewelding to be fully automated.

In accordance with the invention, there is thus provided a method of controlling weldpool penetration during root pass welding in an open butt joint defined in a workpiece to be welded by a welding torch with a welding wire being continuously fed from the welding torch to the joint to form a weldpool penetrating the joint, the work. piece and the welding torch being movable relative to one another, which method comprises the steps of:

(a) positioning visual sensing means ahead of the welding torch and in alignment with the joint for frontly viewing the weldpool at an angle of about 10° to about 20° relative to a line tangent to the workpiece at the weldpool, to thereby provide a full image of the weldpool defining a weldpool contour line, the sensing means and welding torch being disposed on a common side relative to the workpiece; and (b) processing the weldpool image through computer means including image processing means operatively coupled to control means, the image processing means analysing the weldpool contour line to derive therefrom weldpool penetration depth and comparing the weldpool penetration depth with a predetermined value, to thereby provide an information signal representative of weldpool penetration error which is fed to the control means, the control means issuing control signals in response to the information signal for controlling welding parameters such as to provide a root pass weld having a predetermined penetration.

The present invention also provides, in a further aspect thereof, an apparatus for carrying out a method as defined above, which comprises:

visual sensing means positioned ahead of the welding torch and alignment with the joint for frontly viewing the weldpool at an angle of about 10° to about 20° relative to a line tangent to the workpiece at the weldpool, to thereby provide a full image of the weldpool defining a weldpool contour line, the sensing means and welding torch being disposed on a common side relative to the workpiece; and computer means including image processing means operatively coupled to control means, the image processing means adapted to process the weldpool image so as to analyse the weldpool contour line to derive therefrom weldpool penetration depth and to compare the weldpool penetration depth with a predetermined value, to thereby provide an information signal representative of weldpool penetration error which is fed to the control means, the control means issuing control signals in response to the information signal for controlling welding parameters such as to provide a root pass weld having a predetermined penetration.

Applicant has found quite unexpectedly that by viewing the weldpool at an angle of about 10° to about 20° relative to a line tangent to the workpiece at the weldpool location, a full image of the weldpool defining a weldpool contour line can be provided, and that the weldpool contour line can be analysed to derive the weldpool penetration depth which can then be compared with a predetermined value corresponding to a desired penetration depth, the resulting information being used to control the welding parameters such as to provide a root pass weld having the desired penetration. It should be noted that at a view angle smaller than about 10°, the still hot weld bead located just behind the weldpool comes into the field of view and can thus cause erroneous measurements, particularly in the case of small diameter pipes. At a view angle greater than about 20°, on the other hand, the bottom of the weldpool which is indicative of the weldpool penetration depth can no longer be seen as it becomes hidden underneath the weldpool itself.

Preferably, the angle of view is about 15° relative to the aforesaid tangent line. The visual sensing means preferably used in a CID (charged injection device) - type video camera, but other types of video camera can be used as well, such as the CCD (charged coupled device) - camera.

According to a preferred embodiment of the invention, the image processing means digitizes the weldpool image and analyses the digitized image such as to locate along the weldpool contour line a point indicative of the weldpool penetration depth (i.e. the bottom point of the weldpool contour line) and to determine a position coordinate of that point for comparing with a reference coordinate to thereby generate the information signal representative of the weldpool penetration error.

In another preferred embodiment, the visual sensing means is also used to monitor the position of the welding wire in the joint, thereby enabling seam tracking. To this end, a further control means is operatively coupled to the image processing means, the image processing means being further adapted to analyse the weldpool contour line such as to derive therefrom both seam center line position and welding wire position and to compare the welding wire position with the seam center line position, to thereby provide a further information signal representative of seam tracking error which is fed to the further control means, the further control means issuing a further control signal in response to the further information signal for controlling seam tacking such as to maintain the welding wire centrally positioned in the joint. The weldpool image digitized by the image processing means can thus be analysed so as to locate along the weldpool contour line an inwardly extending recess indicative of the welding wire position and to determine a position coordinate of such a recess for comparing with the seam center line position to thereby generate the further information signal representative of the seam tracking error.

In a preferred construction of the apparatus according to the invention, the visual sensing means is fixed to a welding arm holding the welding torch, the welding arm being pivotally mounted for pivotal movement about a pivot axis in a direction toward or away from the workpiece. The welding arm is maintained at a predetermined distance from the workpiece by support means in contact engagement with the workpiece, the support means contacting the workpiece at a point lying on a line crossing the weldpool at an angle of 90° relative to the joint. Preferably, the support means comprise an elongated support member fixedly connected at one end thereof to the welding arm, and a support roller mounted at the other end of the support member for rolling contact engagement with the workpiece at the aforesaid contact point. Since the visual sensing means is fixedly mounted on the welding arm, such an arrangement enables the workpiece surface adjacent the weldpool to be maintained at a fixed height in the field of view of the visual sensing means, even where the workpiece actual height or position would vary as in the case of pipes of slightly oval cross-section.

The invention is particularly useful for controlling weldpool penetration during the root pass welding of pipe butt joints. In order to enable pipes of varying diameters to be welded while still maintaining the necessary view angle, the welding arm is advantageously mounted in a manner such as to permit the pivot axis thereof to be adjustably moved along a line parallel with a radius line passing through the weldpool and intersecting the center of the pipe.

Not only is the invention capable of controlling weldpool penetration, but it can also control seam tracking using the same visual sensing means and image processing means. Since adaptive feedback is used to perform the necessary controls, the apparatus constantly adapts to varying conditions such as changes in gap, alignment, root face or temperature (due to heat flow effects), thus ensuring a defect free weld.

BRIEF DESCRIPTION OF THE DRAWINGS

Further features and advantages of the invention will become more readily apparent from the following description of preferred embodiments as illustrated by way of example in the accompanying drawings, in which.

DESCRIPTION OF PREFERRED EMBODIMENTS

Figure 1:
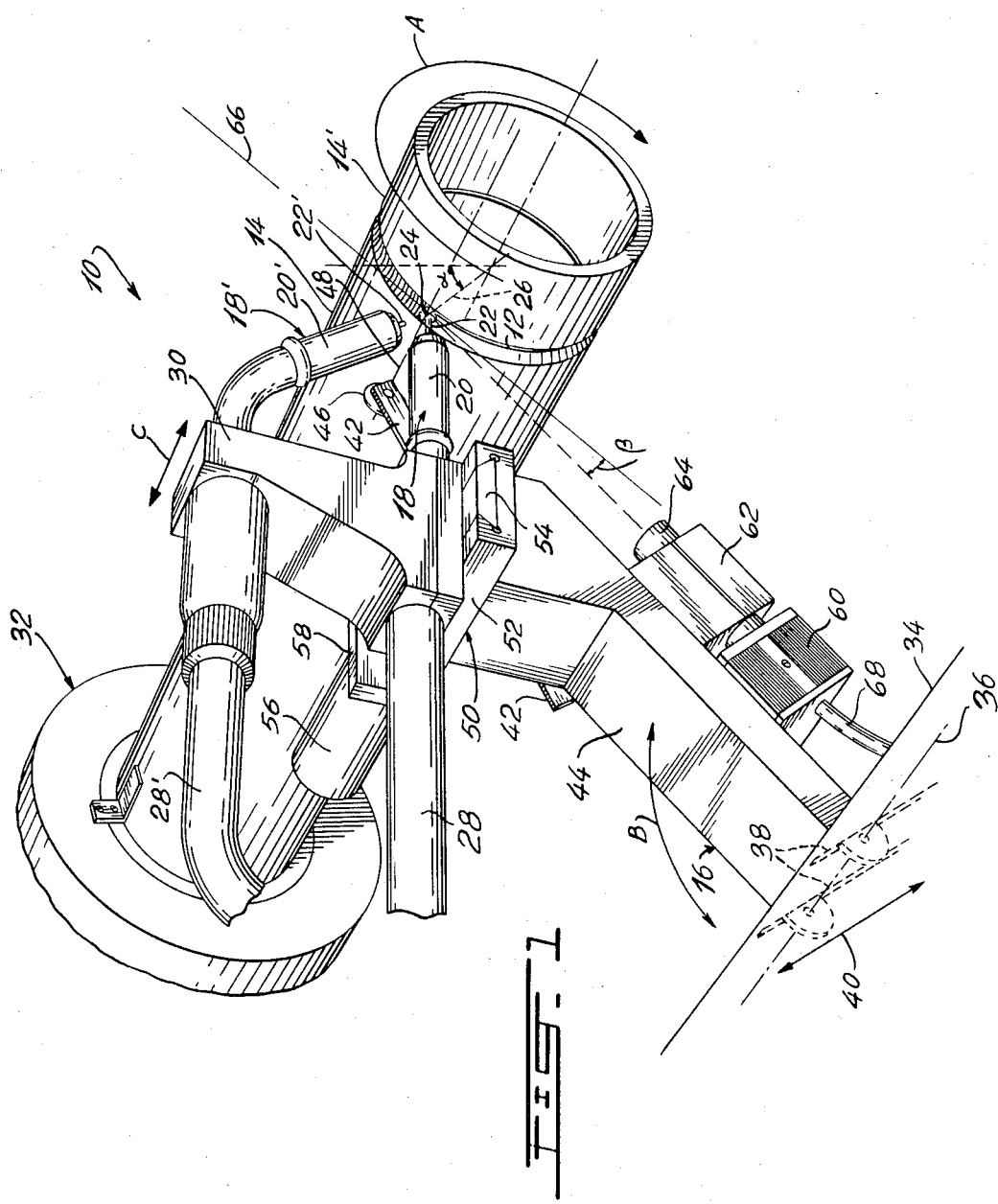
FIG. 1 is a perspective view of a pipe welding system equiped with an apparatus according to the invention, for controlling weldpool penetration.

Referring first to FIG. 1, there is illustrated a fully automated pipe welding system generally designated by reference numeral 10 and seen performing root pass welding of an open butt joint 12 defined between two workpiece members or pipes 14 and 14' to be joined. As shown, the welding system 10 comprises a welding arm 16 holding two welding torches 18 and 18', the welding torch 18 being adapted to perform root pass welding and the welding torch 18' to perform filler pass welding. The torch 18 is provided at its welding end with a gas cup 20 from which is discharged a stream of inert gas and from which a welding wire 22 is continuously fed to the joint 12 to form a weldpool 24 penetrating the joint, the weldpool 24 being located along a radius line 26 defining an angle a of 45° relative to the vertical. The welding wire 22 and inert gas are conveyed to the gas cup 20 through a suitable conduit 28 held by the upper part 30 of the welding arm 16. The torch 18' is similarly provided with a gas cup 20' and conduit 28' for feeding the necessary welding wire 22' and inert gas to the joint 12 during the filler pass. A head stock 32 is secured to the pipe member 14 for rotating the pipe members 14,14' in the direction shown by the arrow A, thereby moving the pipe members relative to the welding torches 18,18'.

The welding arm 16 is pivotally mounted on the sidewall 34 of a support structure for pivotal movement about a pivot axis 36 in a direction toward or away from the pipe members 14,14', as shown by arrow B. The lower end of the welding arm 16 is adjustably mounted through slots 38 so as to permit the pivot axis 36 to be adjustably moved along a line 40 parallel with the radius line 26. The welding arm 16 is maintained at a predetermined distance from the pipe members 14,14' by means of an elongated support member 42 fixedly connected at one end to the lower part 44 of the welding arm 16 and riding at the other on the pipe member 14 via a support roller 46, the roller 46 contacting the pipe surface at a point lying on a line 48 crossing the weldpool 24 at an angle of 90° relative to the joint 12. A slide member 50 is arranged between the upper and lower parts 30 and 44 of the welding arm 16 for laterally displacing the upper part 30 (as shown by arrow C) and thus laterally moving the welding torches 18 and 18' for proper seam tracking. The slide member 50 comprises a base 52 which is fixed to the lower part 44 of the welding arm and within which is slidably engaged a movable element 54 fixed to the upper part of the welding arm. The movable element 54 is displaced by means of a motor 56 mounted to the slide member 50 by a suitable mounting element 58.

A CID-type video camera 60 is fixed to the lower part 44 of the welding arm 16 by means of a mounting bracket 62 holding the camera lens 64 in clamping engagement. As shown, the camera 60 is positioned ahead of the welding torch 18 and in alignment with the joint 12 for frontly viewing the weldpool 24 at an angle B relative to a line 66 tangent to the pipe at the weldpool, the angle B ranging from about 10° to about 20°. The camera 60 is electrically connected by a wire 68 to a control computer 70 which is schematically illustrated in FIG. 2, for suitably processing the weldpool image.

Figure 2:
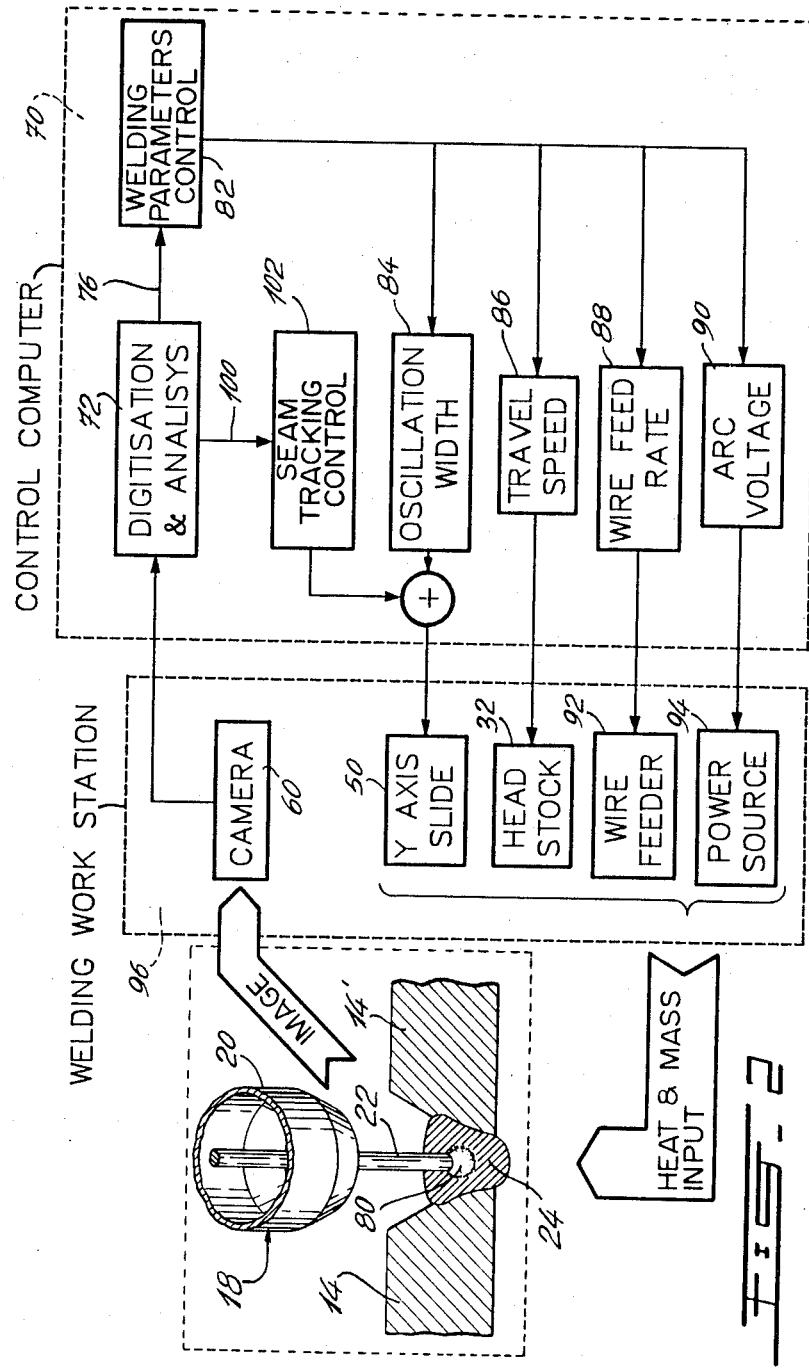
FIG. 2 is a schematic block diagram illustrating how the weldpool image is processed to balance heat and mass input.
Figure 3:
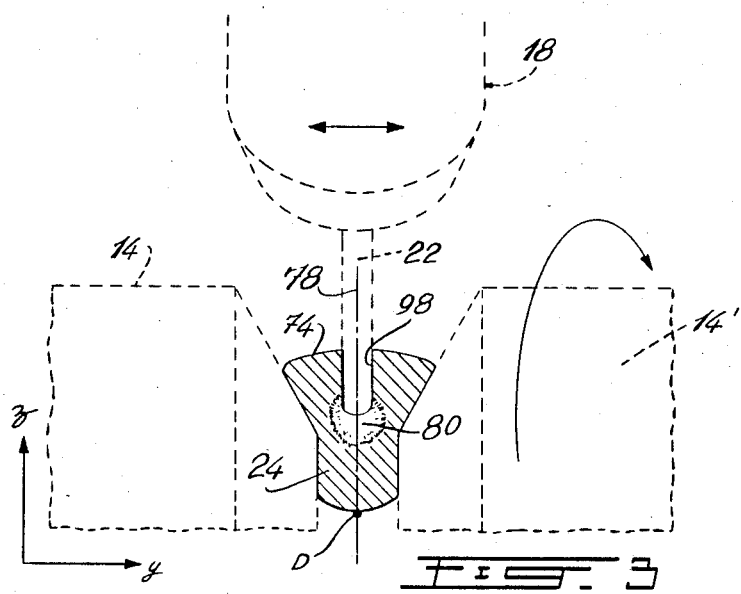
FIG. 3 represents a front view of the weldpool as seen by the visual sensing means.

As shown in FIGS. 2 and 3, the weldpool image as picked up by the camera 60 is first processed through an image processing unit 72 which digitizes the image and analyses the digitized image so as to locate along the weldpool contour line 74 a point D indicative of the weldpool penetration depth and to determine the z coordinate of that point. Such a position coordinate of point D is then compared with a reference coordinate which is at a fixed level within the image viewed and corresponds to the desired penetration depth to provide an information signal 76 representative of weldpool penetration error.

Comparison with a fixed reference coordinate is possible because the welding arm 16 is maintained at a predetermined distance from the workpiece 14,14' and because the camera is fixedly mounted on the welding arm 16, thus maintaining the workpiece surface adjacent the weldpool 24 at a fixed height in the field of view of the camera; assuming a workpiece of constant thickness, the opposite surface, i.e. the inner surface of the pipe members 14,14', will therefore also be at a fixed height in the field of view of the camera. Accordingly, this reference coordinate will have to be adjusted to different levels for workpieces of different thicknesses.

Point D is advantageously located by first determining the width of the weldpool 24, dividing the weldpool width by two to derive the seam center line 78 and scanning the image along the line 78 until the bottom of the weldpool is intersected, the point of intersection corresponding to point D, all these steps being performed by intensity contrast measurement since the pipe members 14,14', welding torch 18 and welding wire 22 cannot be seen in the image as they do not themselves generate any light. The information signal 76 is fed to a welding parameter control unit 82 for issuing command signals to oscillation width control unit 84, travel speed control unit 86, wire feed rate control unit 88 and arc voltage control unit 90 which in turn act respectively on the slide member 50, head stock 32, wire feeder 92 and power source 94 of the welding work station 96 so as to provide a root pass weld having the desired penetration.

The image processing unit 72 is also adapted to analyse the weldpool image such as to locate along the weldpool contour line 74 an inwardly extending recess 98 corresponding to the welding wire position and to determine the y coordinate of the recess 98. Such a position coordinate of the recess 98 is then compared with the y coordinate of point D so as to provide a further information signal 100 representative of seam tracking error. This information signal 100 is fed to a seam tracking control unit 102 for issuing a control signal which is combined with the control signal delivered by the oscillation width control unit 84, the resulting control signal acting on the slide member 50 to maintain the welding wire 22 centrally positioned in the joint 12.

Figure 4A:
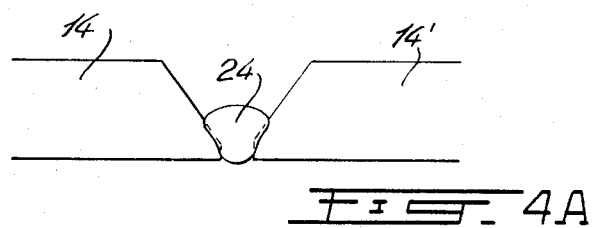
FIGS. 4A, 4B and 4C are fragmentary section views illustrating weldpools with insufficient, adequate and excessive penetrations, respectively.
Figure 4B:
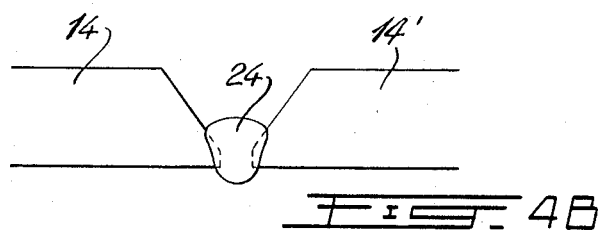
Figure 4C:
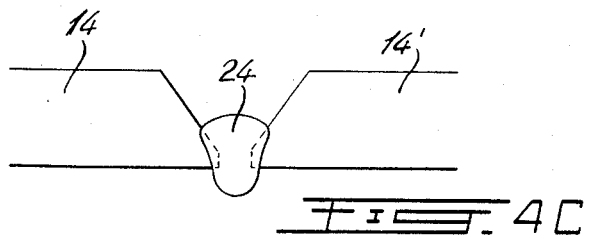

FIGS. 4A, 4B and 4C schematically illustrate weldpools 24 having insufficient, adequate and excessive penetrations, respectively, the weldpool penetration shown in FIG. 4B being typical of that obtained in accordance with the invention.

We claim:

1. An apparatus for controlling weldpool penetration during root pass welding in an open butt joint defined in a workpiece to be welded by a welding torch with a welding wire being continuously fed from the welding torch to said joint to form a weldpool penetrating the joint, said workpiece and said welding torch being movable relative to one another, said apparatus comprising:
   visual sensing means positioned ahead of said welding torch and in alignment with said joint for frontly viewing the weldpool at an angle of about 10° to about 20° relative to a line tangent to said workpiece at said weldpool, to thereby provide a full image of said weldpool defining a weldpool contour line, said sensing means and said welding torch being disposed on a common side relative to said workpiece; and
   computer means including image processing means operatively coupled to control means, said image processing means adapted to process said weldpool image so as to analyse said weldpool contour line to derive therefrom weldpool penetration depth and to compare said weldpool penetration depth with a predetermined value, to thereby provide an information signal representative of weldpool penetration error which is fed to said control means, said control means issuing control signals in response to said information signal for controlling welding parameters such as to provide a root pass weld having a predetermined penetration.

2. An apparatus as claimed in claim 1, wherein said angle of view is about 15° relative to said tangent line.

3. An apparatus as claimed in claim 1, wherein said visual sensing means is a CID-type video camera.

4. An apparatus as claimed in claim 1, wherein said image processing means is adapted to digitize said weldpool image and to analyse the digitized image such as to locate along said weldpool contour line a point indicative of the weldpool penetration depth and to determine a position coordinate of said point for comparing with a reference coordinate to thereby generate said information signal representative of said weldpool penetration error.

5. An apparatus as claimed in claim 1, wherein a further control means is operatively coupled to said image processing means, said image processing means being further adapted to analyse said weldpool contour line such as to derive therefrom both seam center line position and welding wire position and to compare said welding wire position with said seam center line position, to thereby provide a further information signal representative of seam tracking error which is fed to said further control means, said further control means issuing a further control signal in response to said further information signal for controlling seam tracking such as to maintain said welding wire centrally positioned in said joint.

6. An apparatus as claimed in claim 5, wherein said image processing means is adapted to digitize said weldpool image and to analyse the digitized image such as to locate along said weldpool contour line an inwardly extending recess indicative of the welding wire position and to determine a position coordinate of said recess for comparing with said seam center line position to thereby generate said further information signal representative of said seam tracking error.

7. An apparatus as claimed in claim 1, wherein said visual sensing means is fixed to a welding arm holding said welding torch.

8. An apparatus as claimed in claim 7, wherein said welding arm is pivotally mounted for pivotal movement about a pivot axis in a direction toward or away from said workpiece, and is maintained at a predetermined distance from said workpiece by support means in contact engagement with said workpiece, said support means contacting said workpiece at a point lying on a line crossing said weldpool at an angle of 90° relative to said joint.

9. An apparatus as claimed in claim 8, wherein said support means comprise an elongated support member fixedly connected at one end thereof to said welding arm, and a support roller mounted at the other end of said support member for rolling contact engagement with said workpiece at said contact point.

10. An apparatus as claimed in claim 8, wherein said workpiece is a pipe and said weldpool is located along a radius line, and wherein said welding arm is adjustably mounted so as to permit the pivot axis thereof to be adjustably moved along a line parallel with said radius line.

11. An apparatus as claimed in claim 10, wherein said radius line defines an angle of about 45° relative to a vertical line.

12. A method of controlling weldpool penetration during root pass welding in an open butt joint defined in a workpiece to be welded by a welding torch with a welding wire being continuously fed from the welding torch to said joint to form a weldpool penetrating the joint, said workpiece and said welding torch being movable relative to one another, said method comprising the steps of:

(a) positioning visual sensing means ahead of said welding torch and in alignment with said joint for frontly viewing the weldpool at an angle of about 10° to about 20° relative to a line tangent to said workpiece at said weldpool to thereby provide a full image of said weldpool defining a weldpool contour line, said sensing means and said welding torch being disposed on a common side relative to said workpiece; and (b) processing said weldpool image through computer means including image processing means operatively coupled to control means, said image processing means analysing said weldpool contour line to derive therefrom weldpool penetration depth and comparing said weldpool penetration depth with a predetermined value, to thereby provide an information signal representative of weldpool penetration error which is fed to said control means, said control means issuing control signals in response to said information signal for controlling welding parameters such as to provide a root pass weld having a predetermined penetration.

13. A method as claimed in claim 12, wherein said weldpool image is digitized by said image processing means and the digitized image is analysed such as to locate along said weldpool contour line a point indicative of the weldpool penetration depth and to determine a position coordinate of said point for comparing with a reference coordinate to thereby generate said information signal representative of said weldpool penetration error.

14. A method as claimed in claim 12, wherein a further control means is operatively coupled to said image processing means, and wherein said weldpool contour line is analysed such as to derive therefrom both seam center line position and welding wire position, said welding wire position being compared with said seam center line position to thereby provide a further information signal representative of seam tracking error which is fed to said further control means, said further control means issuing a further control signal in response to said further information signal for controlling seam tracking such as to maintain said welding wire centrally positioned in said joint.

15. A method as claimed in claim 14, wherein said weldpool image is digitized by said image processing means and the digitized image is analysed such as to locate along said weldpool contour line an inwardly extending recess indicative of the welding wire position and to determine a position coordinate of said recess for comparing with said seam center line position to thereby generate said further information signal representative of said seam tracking error.

* * * * *